United States Patent [19]

Osada et al.

[11] 3,770,443

[45] Nov. 6, 1973

[54] PHOTOSENSITIVE COMPOSITION COMPRISING A PHOTOSENSITIVE POLYMER

[75] Inventors: Chiaki Osada; Masato Satomura; Hisatake Ono, all of Saitama, Japan

[73] Assignee: Fuji Photo Film Co., Ltd., Kanagawa, Japan

[22] Filed: June 16, 1972

[21] Appl. No.: 263,577

[30] Foreign Application Priority Data

June 16, 1971 Japan .................................. 46/43052

[52] U.S. Cl. .................. 96/86 P, 96/35.1, 96/87 R, 96/115 R, 204/159.14

[51] Int. Cl. ............................ G03c 1/68, G03c 1/70

[58] Field of Search .................. 96/115 R, 86 P, 87, 96/35.1; 204/159.14, 159.15

[56] References Cited

UNITED STATES PATENTS

| | | | |
|---|---|---|---|
| 3,357,831 | 12/1967 | Wu | 96/115 R |
| 3,418,295 | 12/1968 | Schoenthaler | 96/115 R |

*Primary Examiner*—Ronald H. Smith
*Attorney*—Richard C. Sughrue et al.

[57] ABSTRACT

A photosensitive composition comprising as the main photosensitive component a high molecular weight compound containing therein repeating units of the following general formula

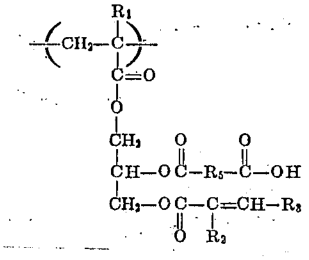

wherein $R_1$ represents H or $CH_3$, $R_2$ represents H, CN or COOR, in which R represents H or an alkyl group of 1 to 6 carbon atoms; $R_3$ represents

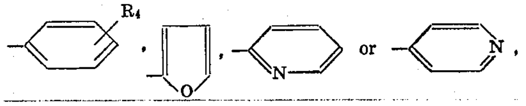

in which $R_4$ represents H, halogen, $NO_2$, $CH_3$, $C_2H_5$, $OCH_3$ or $OC_2H_5$; and $R_5$ represents

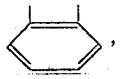

—CH=CH— or $—CH_2—CH_2—$.

9 Claims, No Drawings

PHOTOSENSITIVE COMPOSITION COMPRISING A PHOTOSENSITIVE POLYMER

BACKGROUND OF THE INVENTION

1. Field of the Invention

This invention relates to a photosensitive composition which contains as a main component a photosensitive resin having a cinnamoyl, a $\beta$-(2-furyl)acryloyl or a $\beta$-(pyridyl)acryloyl group in the side chain. More particularly, it relates to a photosensitive composition having a strong adhesion to metal.

2. Description of the Prior Art

Disadvantageously, the adhesion of photosensitive polyvinyl cinnamate resins to metal is not very good and is not suitable for a system subjected to heavy abrasion, such as a printing plate. This resin is an excellent photosensitive resin which is used widely and is suitable for a system not subjected to abrasion, such as a photoresist. For the manufacture of previous photosensitive vinyl cinnamate resins, a process is used in which an ester is obtained from polyvinyl alcohol having hydroxyl groups bonded directly to the main chain as starting material.

That is to say, in that process polyvinyl alcohol is reacted with another reagent to yield a polymer having physical properties other than those of the original material. However, disadvantageously the reaction is not quantitative in yield because the reaction system is heterogeneous.

For example, the following processes have been studied in detail: (1) polyvinyl alcohol is dissolved in an aqueous alkaline solution and cinnamic acid chloride dissolved in an organic solvent is added dropwise thereto (as disclosed in Japanese Publication No. 1492/63, 20188/65 etc.) and (2) polyvinyl alcohol is swollen with pyridine at a high temperature and at about 50°C cinnamic acid chloride is added dropwise thereto (as disclosed in Minsk et al., *Journal of Applied Polymer Science*, 2 302 (1959)).

However, in the process (1), the reaction takes place in the aqueous phase at the beginning of the reaction and in the organic phase at the end of the reaction resulting in a heterogeneous reaction system, and metal ions are present inevitably in the polymer formed due to the use of the alkali. In the process (2), the reaction takes place in the swollen polyvinyl alcohol in pyridine so that disadvantageously the reaction does not proceed quantitatively.

SUMMARY OF THE INVENTION

The monomers used in obtaining the high molecular weight material having a photosensitive group of this invention can be represented by the following general formula:

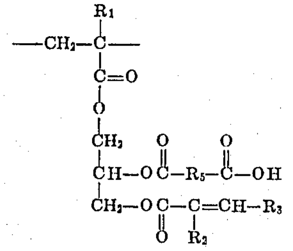

wherein $R_1$ represents H or $CH_3$, $R_2$ represents H, CN or COOR, in which R represents H or an alkyl group of from one to six carbon atoms, $R_3$ represents

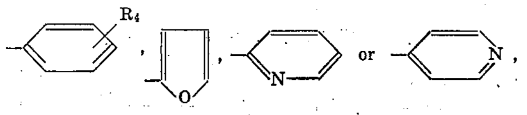

in which $R_4$ represents H, halogen, $NO_2$, $CH_3$, $C_2H_5$, $OCH_3$ or $OC_2H_5$, and $R_5$ represents

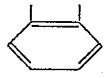

$-CH=CH-$ or $-CH_2-CH_2-$.

DETAILED DESCRIPTION OF THE INVENTION

The synthesis of the above described monomer can be as follows:

Cinnamic acid, $\beta$-(2-furyl)acrylic acid, or $\beta$-(pyridyl)acrylic acid is added to glycidyl acrylate or glycidyl methacrylate in the presence of a tertiary amine, such as triethylamine, piperidine, N,N-diethylcyclohexylamine, triethanol amine, and the like, and a cyclic acid anhydride, such as maleic anhydride, phthalic anhydride, succinic anhydride and the like, is then added to the hydroxyl group, which is formed newly through the addition reaction, in the presence of a base, such as pyridine, triethylamine and the like, to introduce the carboxyl group. For example, the reactions can be suitably accomplished by using the cinnamic acid, the $\beta$-(2-furyl)acrylic acid or $\beta$-(pyridyl)acrylic acid or the cyclic acid anhydride in a molar ratio of 1:1 to 2:1 preferably from 1.1:1 to 1.4:1 and the reactions can be conducted at a temperature of from about 50°C to 100°C, preferably 65°C to 85°C. The resulting addition polymerizable monomer can be readily homopolymerized. It can be copolymerized with any preferred monomer to increase the solubility in solvents, adhesion or compatibility with other resins or pigments. Suitable copolymerizable monomers are, for example, $CH_2=C(CH_3)-CO_2C_2H_4OH$, $CH_2=CH-CONHCH_2OH$,

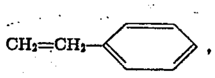

$CH_2=CH-COOR$, $CH_2=C(CH_3)-COOR$, 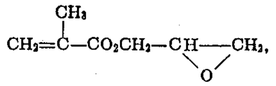

$CH_2=C(CH_3)-CO_2CH_2-CH(OH)-CH_2Cl$, $CH_2=CH-CN$, $CH_2=CHOCOCH_3$, $CH_2=CH-COOH$, $CH_2=C(CH_3)-COOH$ and $CH_2=CH-CONH_2$, where R represents an alkyl group of from 1 to 6 carbon atoms, glycerol acrylate and glycerol methacrylate etc. The copolymerizable monomer can be suitably used at a level ranging from about 5 to 30 percent by weight, preferably about 15 to 25 percent by weight of the total weight of the polymer.

The high molecular weight compound used in this invention can be obtained by the high molecular reaction in a homogeneous system. IN A HOMOGENEOUS SYSTEM. Thus, it can also be obtained by dissolving a homopolymer or copolymer of glycidyl acrylate or methacrylate in an organic solvent and reacting in the same manner as described for synthesis of the monomer with the acid and the acid anhydride in order.

The resulting high molecular weight compound which suitably can have a molecular weight ranging from about 5,000 to about 70,000, preferably from about 10,000 to about 30,000 in combination with a sensitizer is coated on a support, for example, a polyester such as polyethylene terephthalate, a cellulose ester such as cellulose triacetate, metal plate such as an aluminum plate, a copper plate or a zinc plate, and the like at a thickness of about 1 to 100μ, preferably about 2 to 5μ, dried and imagewise exposed to the irradiation of light whereby the exposed area is hardened due to cross-linking and the unexposed area is washed off with an organic solvent, such as acetone, benzene, toluene, xylene, methyl ethyl ketone, ethyl acetate, tetrahydrofuran, dioxane, dimethyl-formamide, dimethyl sulfoxide, methyl cellosolve, cyclohexanone, methyl cellosolve acetate, γ-butyrolactone, benzyl alcohol and mixtures thereof, to yield a clear image. The high molecular weight compound to be used in this invention is applicable for use as off-set plates, photoresists and other uses similar to the previously used poly(cinnamic acid ester derivative).

As the sensitizers, conventional sensitizers for cinnamic acid esters, such as aromatic nitro or ketone compounds, can be used because the photosensitive moiety of the compound according to this invention has the same reactivity as the cinnamoyl group. Suitable examples of preferred sensitizers are as follows: 2,4,7-trinitro-9-fluorenone, 5-nitro-acenaphthene,p-nitrodiphenyl, p-nitroaniline, picramide, Michler's ketone, 1,2-benzanthraquinone, N-acetyl-4-nitro-1-naphthylamine, N-benzoyl-4-nitro-1-naphthylamine etc. The amount of sensitizer added can vary depending on the kind thereof and generally is preferably from about 0.5 to 20 wt.% based on the weight of photosensitive high molecular weight material.

As photosensitive high molecular weight compounds to be used in this invention, those having the following structures are especially effective:

(a)

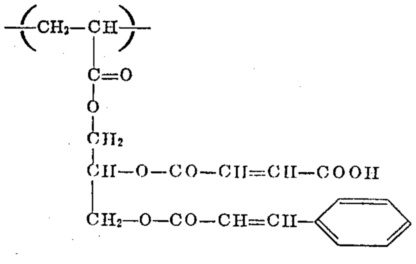

(b)

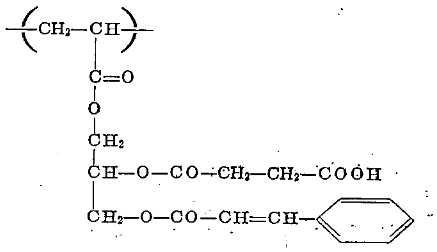

(c)

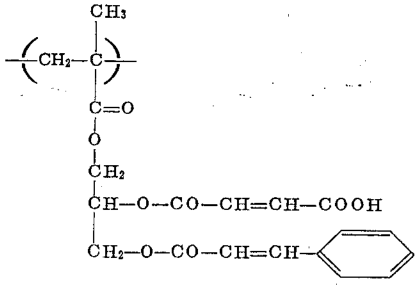

(d)

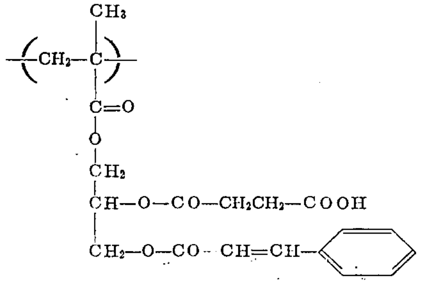

(e)

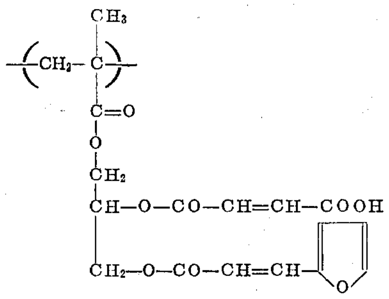

(f)

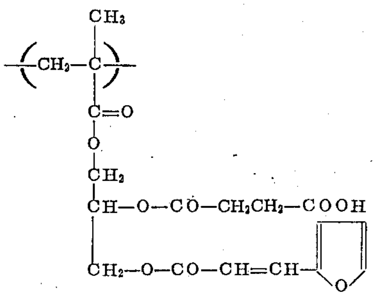

(g)

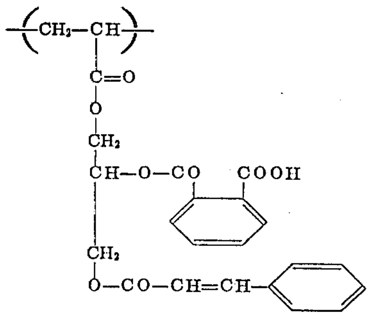

(h)
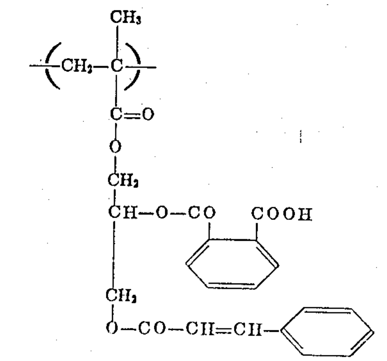

(i)
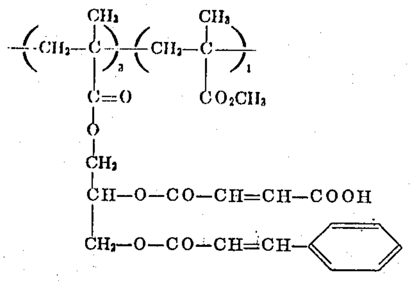

(j)
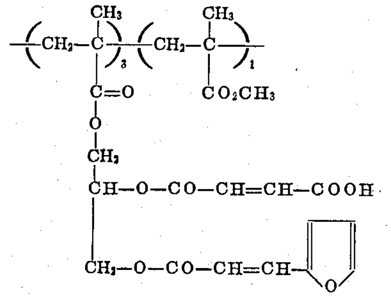

(k)
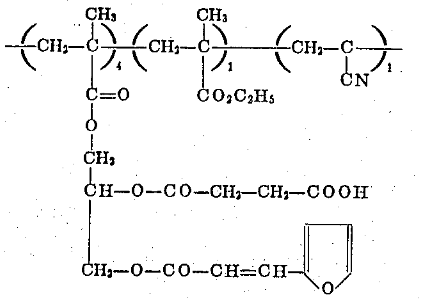

(l)
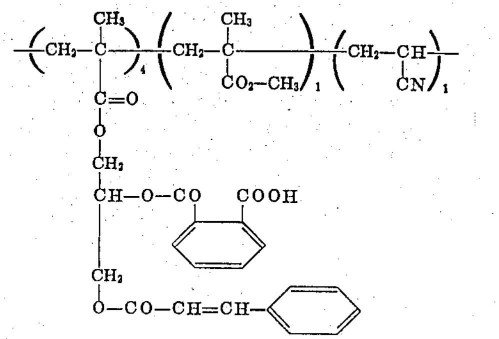

(m)
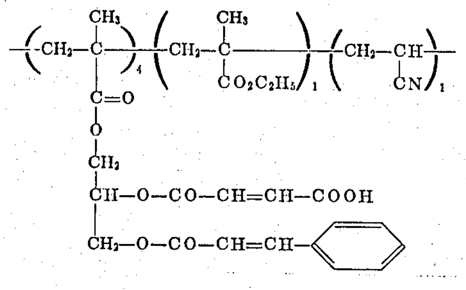

This invention will now be illustrated in greater detail by reference to the following examples.

Example 1

14g of glycidyl methacrylate, 16g of cinnamic acid and 5g of triethylamine were dissolved in 240g of methyl ethyl ketone and metallic copper was added thereto and the mixture was refluxed for about 12 hrs with stirring. After the reaction, the low boiling compounds were distilled off under a reduced pressure, the residue was dissolved in about 100g of pyridine, 10g of maleic anhydride was added and the mixture stirred at 100°C for about 3 hrs. The reaction mixture was added to 500 ml of water and the oil separated was extracted with ethyl acetate. The ethyl acetate solution was washed well with water, with aqueous diluted hydrochloric acid and then with water, dried with Glauber's salt, filtered and the solvent was distilled off under a reduced pressure to yield 37g of a pale yellow oil. 37g of the resulting addition-polymerizable monomer and 2.8g of methyl methacrylate were dissolved in 150 ml of methyl ethyl ketone, 350 mg of N,N'-azobisisobutyronitrile as an initiator were added thereto and reacted at 70°C under nitrogen for about 5 hrs.

After the reaction, 200 ml of methyl ethyl ketone and 2g of Michler's ketone were added to prepare a photosensitive liquid, which was coated on a PS aluminum plate and dried to yield a coated film having strong adhesion to the plate.

A printing plate was prepared in a conventional manner from the resulting photosensitive composition by exposure to irradiation and washing with a solvent such as γ-butyrolactone or cellosolve acetate for the resin and a printing plate excellent in printing durability and free from any film separation was obtained.

Example 2

20g of the addition-polymerizable monomer obtained in Example 1, 1g of ethyl methacrylate and 0.6g of acrylonitrile were dissolved in 100 ml of methyl ethyl ketone and 200 mg of N,N'-azobisisobutyronitrile as an initiator were added thereto and reacted at 70° – 75°C under nitrogen for about 7 hrs. After the reaction, 100 ml of methyl ethyl ketone and 1g of 5- nitroacenaphthene were added to prepare a photosensitive liquid, which was then coated on a polyethylene terephthalate film (50μ thick, which was plated electrolytically with copper at a 30μ thickness), and dried. The thickness of the coated layer was about 5μ. The resulting photosensitive composition was irradiated for about 40 sec in contact with a photographic transparent negative using a PLANO PS PRINTER A3 (manufactured by the Fuji Photo Film Co., Ltd.) and washed with methyl isobutyl ketone, whereby the polymer in the unexposed area was dissolved off exposing the copper surface with the light-exposed area becoming insoluble and still covering the copper surface. The etching of the film with 40 percent aqueous ferric chloride at 40°C showed superior properties in film separation and pin-hole formation to polyvinyl cinnamate.

Example 3

14g of glycidyl methacrylate, 15g of β-(2-furyl) acrylic acid and 5g of triethylamine were dissolved in 240g of tetrahydrofuran, 1g of sulfur was added thereto and reacted for about 12 hrs under nitrogen with stirring and treated in the same manner as described in Example 1 to yield 22g of an addition-polymerizable monomer, which was dissolved in 100g of pyridine and 8g of succinic anhydride were added and reacted at 100°C for 2 hrs with stirring. After the reaction, the reaction mixture was added to 500 ml of water and the oil separated was extracted with ethyl acetate and washed well with water, with aqueous diluted hydrochloric acid and then with water, activated carbon was added, the entire mixture was dried with Glauber's salt and filtered, and the solvent was distilled off under a reduced pressure to yield 18g of oil. The resulting oil was then dissolved in 100g of tetrahydrofuran and 180 mg of benzoyl peroxide as an initiator were added thereto and reacted at 70° – 75°C under nitrogen for about 7 hrs. After the reaction, 100g of tetrahydrofuran and 200mg of 2,4,7-trinitro-9-fluorenone were added to prepare a photosensitive liquid. On testing the properties of the resulting photosensitive material in the same manner as described in Example 1, a printing plate excellent printing durability and free from film separation was obtained.

Example 4

In a manner similar to that described in Examples 1 – 3, photosensitive high molecular weight compounds of the following component ratios were obtained and the properties of these compounds were tested.

| Test No. | Composition | Amount Added (g) |
|---|---|---|
| | Glycidyl Acrylate | 14 |
| I | Cinnamic Acid | 15 |
| | Phthalic Anhydrine | 15 |
| | Glycidyl Methacrylate | 14 |
| II | β-(2-Furyl)acrylic Acid | 14 |
| | Maleic Anhydride | 10 |
| | Glycidyl Methacrylate | 14 |
| | Cinnamic Acid | 15 |
| III | Phthalic Anhydride | 10 |
| | Methyl Methacrylate | 1.5 |
| | Acrylonitrile | 1.0 |
| | Glycidyl Acrylate | 14 |
| IV | Cinnamic Acid | 15 |
| | Maleic Anhydride | 10 |
| | Glycidyl Methacrylate | 14 |
| V | Cinnamic Acid | 15 |
| | Succinic Anhydride | 9.8 |
| | Glycidyl Methacrylate | 14 |
| | β-(2-Furyl)acrylic Acid | 14 |
| VI | Succinic Anhydride | 9.8 |
| | Ethyl Methacrylate | 1.3 |
| | Acrylonitrile | 0.8 |

It was found that the properties of the higher molecular weight compounds of tests No. I – VI were superior to those of the previous polyvinyl cinnamate when the same test was carried out using 4 wt.% of N-acetyl-4-nitro-1-naphthylamine based on the high molecular weight compound.

Example 5

14g of glycidyl methacrylate and 140mg of N,N'-azobisisobutyronitrile were dissolved in 80g of methyl ethyl ketone and reacted at 70°C under nitrogen for about 4 hrs. The reaction mixture was then poured into n-hexane to purify the polymer. 11g of the resulting polymer were dissolved in 50g of pyridine, 12g of cinnamic acid were added and reacted at 100°C for 8 hrs, 12g of phthalic anhydride were then added and reacted for 7 hrs.

After the reaction, the reaction mixture was poured into ethyl ether to purify the polymer. 10g of the resulting polymer were dissolved in 95g of methyl ethyl ketone and 500mg of N-acetyl-4-nitro-1-naphthylamine as a sensitizer were added to prepare a photosensitive liquid.

The resulting solution was coated on a PS aluminum plate, which had been treated with a zirconium fluoride salt to render it hydrophilic, and dried. The thickness of the coated film was about 4μ. The resulting photosensitive composition was exposed for 30 sec in contact with a photographic transparent negative using a PLANO PS PRINTER A3 (manufactured by the Fuji Photo Film Co., Ltd.) and the polymer at the unexposed area was dissolved off with methyl ethyl ketone to yield a clear image.

The resulting printing plate was placed on a conventional off-set printing machine and used for printing using a commercial ink and wetting water, whereupon it showed a very good transfer and durability and gave prints of a clear image.

It is readily apparent from the above disclosure that the high molecular weight compound can contain side chain groups of only cinnamoyl groups, of only β-(2-furyl) groups, or of only β-(pyridyl) groups or it may contain mixtures of these groups on the side chains.

While the invention has been described in detail and in terms of specific embodiments thereof, it will be apparent to one skilled in the art that various changes and modifications can be made therein without departing from the spirit and scope thereof.

What is claimed is:

1. A photosensitive composition comprising as the main photosensitive component a high molecular weight polymer of a monomer having the following general formula

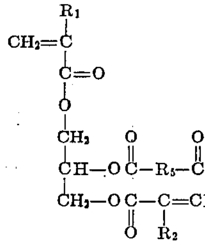

wherein $R_1$ represents a hydrogen atom or a methyl group; $R_2$ represents a hydrogen atom, a cyano group or a —COOR group, in which R represents a hydrogen atom or an alkyl group of 1 to 6 carbon atoms; $R_3$ represents

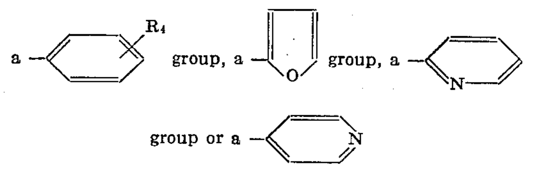

in which $R_4$ represents a hydrogen atom, a halogen atom, a nitro group, a methyl group, an ethyl group, a methoxy group, or an ethoxy group; and $R_5$ represents a

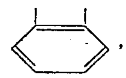

group, a —CH=CH— group or a —$CH_2$—$CH_2$—group.

2. The photosensitive composition of claim 1, wherein said polymer is a homopolymer of said monomer.

3. The photosensitive composition of claim 1, wherein said polymer is a copolymer of said monomer with another monomer selected from the group consisting of

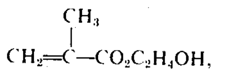

$CH_2{=}CH{-}CONHCH_2OH$, $CH_2{=}CH{-}C_6H_5$, $CH_2{=}CH{-}COOR$,

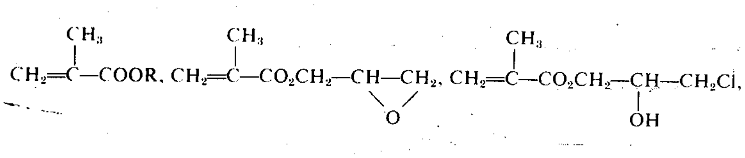

$CH_2{=}CH{-}CN$, $CH_2{=}CHOCOCH_3$, $CH_2{=}CH{-}COOH$,

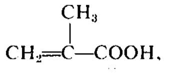

$CH_2{=}CH{-}CONH_2$, glycerol acrylate and glycerol methacrylate, in which R is as defined in claim 1.

4. The photosensitive composition of claim 1, wherein said composition contains a sensitizer.

5. The photosensitive composition of claim 4, wherein said sensitizer is selected from the group consisting of 2,4,7-trinitro-9-fluorenone, 5-nitroacenaphthene, p-nitrodiphenyl, p-nitroaniline, picramide, Michler's ketone, 1,2-benzanthraquinone, N-acetyl-4-nitro-1-naphthylamine and N-benzoyl-4-nitro-1-naphthylamine.

6. The photosensitive composition of claim 4, wherein said sensitizer is present at a level ranging from about 0.5 to 20 percent by weight based on the weight of said polymer.

7. The photosensitive composition of claim 1, wherein said polymer has a molecular weight ranging from about 5,000 to about 70,000.

8. A photosensitive element comprising a support having coated thereon a layer of the photosensitive composition of claim 1.

9. The photosensitive element of claim 8, wherein said support is a polyester film, a cellulose ester film or a metal plate.

* * * * *